(12) United States Patent
Kuipers et al.

(10) Patent No.: US 9,650,093 B2
(45) Date of Patent: May 16, 2017

(54) ADJUSTABLE FLEX SADDLE FOR A BICYCLE OR A MOTORCYCLE

(71) Applicants: Raymond J. Kuipers, Scottsdale, AZ (US); Jason A. Clark, Glendale, AZ (US)

(72) Inventors: Raymond J. Kuipers, Scottsdale, AZ (US); Jason A. Clark, Glendale, AZ (US)

( * ) Notice: Subject to any disclaimer, the term of this patent is extended or adjusted under 35 U.S.C. 154(b) by 134 days.

(21) Appl. No.: 14/643,358

(22) Filed: Mar. 10, 2015

(65) Prior Publication Data

US 2015/0259018 A1 Sep. 17, 2015

Related U.S. Application Data

(60) Provisional application No. 61/950,952, filed on Mar. 11, 2014.

(51) Int. Cl.
*B62J 1/02* (2006.01)

(52) U.S. Cl.
CPC ........................ *B62J 1/02* (2013.01)

(58) Field of Classification Search
CPC ...................... B62J 1/02; B62J 1/10
USPC .................. 297/195.1, 215, 215.1
See application file for complete search history.

(56) References Cited

U.S. PATENT DOCUMENTS

| 5,544,936 | A | * | 8/1996 | Bigolin | B62J 1/08 297/195.1 |
| 5,911,473 | A | * | 6/1999 | Hill | B62J 1/04 297/195.1 |
| 2014/0035332 | A1 | * | 2/2014 | Winefordner | B62J 1/00 297/204 |
| 2016/0244113 | A1 | * | 8/2016 | Li | B62J 1/18 |

* cited by examiner

*Primary Examiner* — Sarah McPartlin
(74) *Attorney, Agent, or Firm* — Morland C. Fischer

(57) ABSTRACT

A saddle on which an individual is seated while riding a bicycle or a motorcycle. The saddle includes a flexible base to support the rider's weight and a stationary nose cap attached to the flexible base. One end of a bumper retaining block is pivotally and detachably connected to the nose cap. A resilient bumper is located between the flexible base and the bumper retaining block. A pair of rails which runs along the bottom of the flexible base is attached to the bicycle/motorcycle. The pair of rails is coupled to the bumper retaining block to push the block towards the flexible base with the resilient bumper sandwiched therebetween. The bumper retaining block can be detached from the stationary nose cap so that the resilient bumper can be replaced by a bumper having a different density to selectively control the flexibility of the base.

13 Claims, 2 Drawing Sheets

ADJUSTABLE FLEX SADDLE FOR A BICYCLE OR A MOTORCYCLE

CROSS-REFERENCE TO RELATED APPLICATIONS

This application is related to Provisional Patent Application No. 61/950,952 filed Mar. 11, 2014.

BACKGROUND OF THE INVENTION

1. Field of the Invention

This invention relates to an adjustable flex saddle to support the weight of one riding a bicycle or a motorcycle. The saddle has a replaceable resilient bumper that is sandwiched between a bumper retaining block and a flexible saddle base to selectively control the stiffness of the saddle.

2. Background Art

A saddle is a well known component of a bicycle or a motorcycle on which a rider is seated. However, the weight to be supported by the saddle can change dramatically depending upon the rider. That is to say, the stiffness of the conventional saddle experienced by the rider is the same regardless of the rider's weight. Moreover, different riding conditions (e.g., smooth roadways or mountainous terrain) may necessitate that the stiffness of the saddle be adjusted to suit the experience and comfort of the rider. Therefore, what would be desirable is a means carried by the saddle to enable a rider to be able to selectively and continuously adjust the stiffness of his saddle to take into account his weight, riding conditions and comfort. In this same regard, being able to adjust the stiffness of the saddle would be advantageous to accommodate the weights of different riders when the bicycle/motorcycle is shared or if the saddle is transferred from one bicycle/motorcycle to another.

SUMMARY OF THE INVENTION

In general terms, an adjustable flex saddle is disclosed to be used by one riding a bicycle or a motorcycle. The adjustable flex saddle includes a flexible saddle base upon which the rider's weight is supported. Extending across the bottom of the saddle base between the front and the rear thereof is a pair of detachable saddle rails. The rails are connected to a clamp by which the adjustable flex saddle is correspondingly connected to the bicycle or motorcycle. Affixed to the front of the saddle base is a stationary end cap. Located adjacent the end cap at the front of the saddle base is a bumper retaining block. A first end of the bumper retaining block has an open mouth and the opposite end has a coupling tail which is pivotally and detachably connected to the stationary end cap by means of a pivot pin so that the bumper retaining block is rotatable relative to the end cap. First ends of the pair of saddle rails are joined together to form a round nose which is removably received in the open mouth at the first end of the bumper retaining block. The opposite free ends of the pair of saddle rails are removably received by holes formed in respective rail holders which project from the rear of the flexible base.

A replaceable elastomeric bumper that is preferably manufactured from a resilient (e.g., rubber) material is located between the flexible saddle base and the bumper retaining block. When the round nose of the saddle rails is removably received by the open mouth of the bumper retaining block, the bumper retaining block is held over and pushed towards the replaceable bumper by which the bumper is compressed against the saddle base. The density (i.e., hardness) of the bumper controls the flexibility of the base and the stiffness of the saddle. When it is desirable to change the flexibility of the saddle base to suit the needs of the rider, the pivot pin is first removed so that the bumper retaining block can be disconnected from the stationary end cap to permit the pair of saddle rails to be detached from their connection between the bumper retaining block and the rail holders. The replaceable bumper can then be removed from the adjustable flex saddle and replaced by a different bumper having a different density by which to enable the rider to selectively adjust the flexibility of the flexible base and the stiffness of the saddle.

DESCRIPTION OF THE PREFERRED EMBODIMENT

Figure 1:
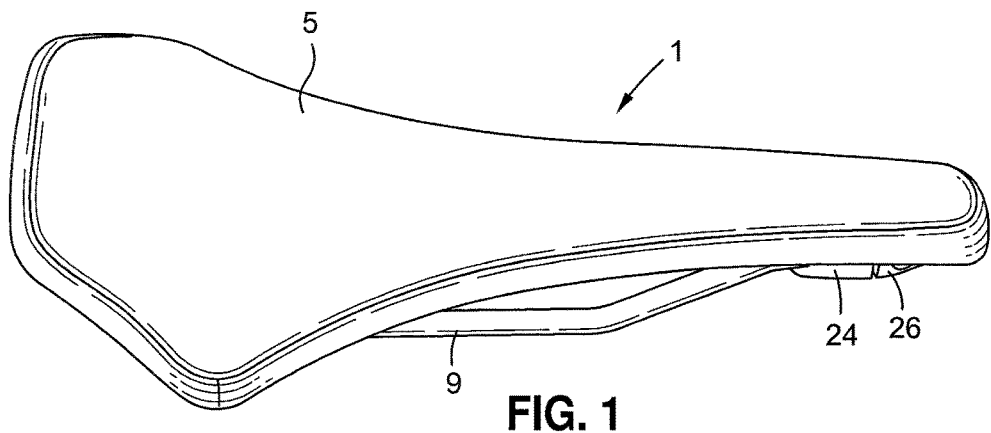
FIG. 1 shows an adjustable flex saddle for a bicycle or a motorcycle according to a preferred embodiment of this invention.
Figure 2:
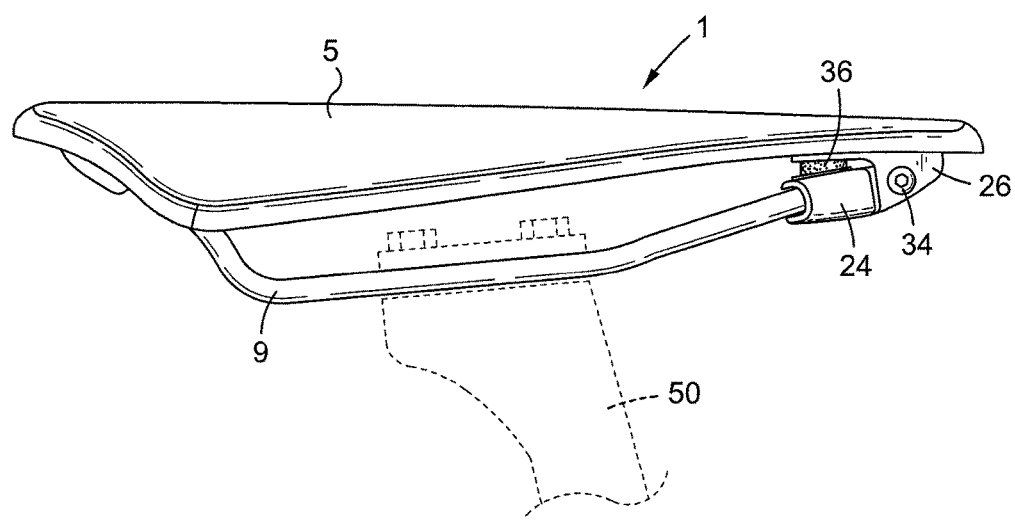
FIG. 2 shows the adjustable flex saddle of FIG. 1 connected to a clamp associated with a bicycle or a motorcycle.
Figure 3:
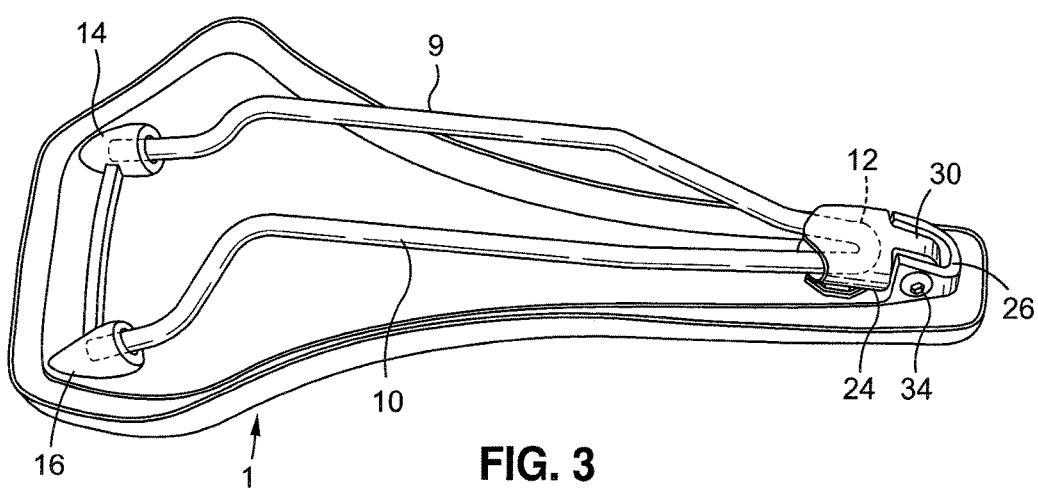
FIG. 3 shows the bottom of the adjustable flex saddle with a pair of detachable saddle rails extending between a bumper retaining block and a pair of rail holders located at opposite ends of a flexible saddle base.
Figure 4:
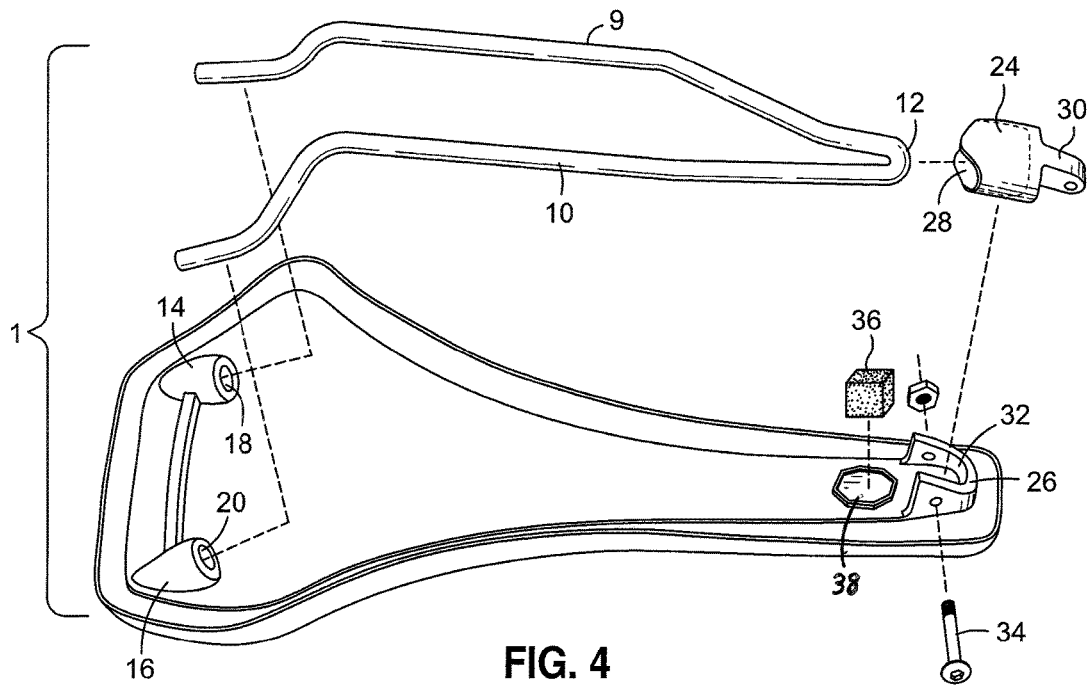
FIG. 4 is an exploded view showing the bottom of the adjustable flex saddle with the pair of detachable rails and the bumper retaining block separated from the saddle so that a resilient bumper can be removed from between the bumper retaining block and the flexible saddle base and replaced by a different bumper.

Referring concurrently to FIGS. 1-6 of the drawings, there is shown a preferred embodiment for an adjustable flex saddle 1 of the kind on which an individual is seated while riding a bicycle. Although the saddle 1 referred to above is ideally used by one riding a bicycle, the advantages of this invention are also applicable to saddles used by those riding motorcycles. As will be explained in greater detail hereinafter, one seated on the saddle, whether it is used on a bicycle or a motorcycle, will be able to selectively adjust the stiffness of the saddle to suit his particular riding requirements.

Located at the top of the adjustable flex saddle 1 is a seat 3 upon which the rider's pelvis is supported. The saddle seat 3 (best shown in FIGS. 5 and 6) is typically manufactured from a comfortable cushion (e.g., foam) material. The saddle seat 3 is often surrounded by an outer protective and decorative cover 5 that is manufactured from leather, or the like. Lying underneath the seat 3 of the adjustable flex saddle 1 is a base 7. The saddle base 7 is typically manufactured from a relatively stiff but flexible (e.g., nylon or carbon fiber) material. The saddle seat 3 and the saddle base 7 are attached to and lie one above the other.

A pair of elongated detachable rails 9 and 10 run longitudinally along the bottom of the saddle base 7 from one end thereof to the other. The saddle rails 9 and 10 are preferably manufactured from a flexible metallic material having a spring memory. First ends of the rails 9 and 10 are co-extensively (i.e., continuously) joined to one another to form a round nose 12. The opposite free ends of the rails 9 and 10 are removably received by respective (e.g., molded) rail holders 14 and 16 which are spaced from one another and project from the rear of the saddle base 7. Each of the rail holders 14 and 16 has a hole 18 and 20 formed therein (best shown in FIG. 4) within which to slidably and removably receive the free end of a corresponding one of the saddle rails 9 and 10. The saddle rails 9 and 10 are connected to the bicycle by means of a conventional seat clamp (designated 50 and shown in phantom lines in FIG. 2).

As an important detail of the adjustable flex saddle 1, a bumper retaining block 24 (best shown in FIGS. 4-6) lies adjacent and is coupled to a stationary U-shaped end cap 26 that is affixed to the front of the saddle base 7. The bumper retaining block 24 has an open mouth 28 (best shown in FIG. 4) located at one end thereof and an outwardly-extending coupling tail 30 at the opposite end. The U-shaped end cap 26 has a cavity 32 formed therein within which to receive the coupling tail 30 of the bumper retaining block 24 such that the end cap 26 surrounds coupling tail 30. A removable coupler (e.g., a pivot pin 34, or the like) extends through each of the end cap 26 and the coupling tail 30 which is surrounded by the end cap. Thus, the coupling tail 30 of the bumper retaining block 24 is pivotally and detachably connected to the stationary end cap 26 to enable block 24 to rotate relative to the end cap 26 towards and away from the saddle base 7 (best shown in FIG. 6).

As another important detail of this invention, a replaceable elastomeric bumper 36 is located below the rotatable bumper retaining block 24 at the front of the saddle base 7. The bumper 36 is preferably manufactured from a resilient (e.g., rubber) material having a spring memory and an ideal thickness of about 5-6 mm.

A bumper recess 38 (best shown in FIG. 4) is formed (e.g., molded) at the front of the saddle base 7 so as to lie above the bumper retaining block 24 and establish a seat within which the replaceable bumper 36 is received. After the bumper 36 is located within the bumper recess 38, the round nose 12 of the saddle rails 9 and 10 is moved into the mouth 28 of the bumper retaining block 24. The bumper retaining block 24 is then pivotally and detachably connected to the end cap 26 by means of the removable pivot pin 34, such that the block 24 is held over and against the bumper 36. By virtue of the bumper retaining block 24 rotating around the pivot pin 34, the resilient bumper 36 will be compressed against the saddle base 7, such that impact forces generated during a ride will be better absorbed by the saddle base which communicates with the block 24 by way of the saddle rails 9 and 10.

In this same regard, the bumper 36 can be removed from the bumper recess 38 and replaced by another bumper from a group of elastomeric bumpers manufactured from resilient materials having different densities. That is, should the rider wish to reduce the flexibility of the saddle base 7 of the adjustable flex bicycle saddle 1, he can select a denser and harder bumper from the group of resilient bumpers to be seated within the bumper recess 38 above the bumper retaining block 24 at the front of the base 7. In cases where the rider wishes to increase the flexibility of the saddle base 7 of the saddle 1, he can select a different bumper having a reduced density in order to customize the stiffness of the saddle to suit his riding needs.

Figure 5:
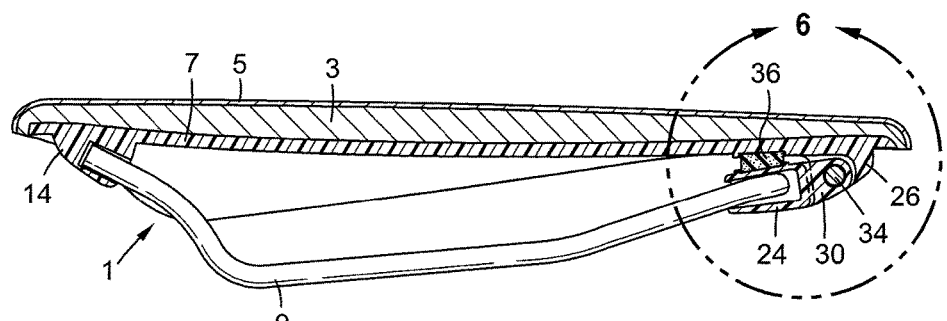
FIG. 5 is a cross-section of the adjustable flex saddle showing the resilient bumper of FIG. 4 sandwiched between the bumper retaining block and the flexible saddle base to control the flexibility of the saddle base.
Figure 6:
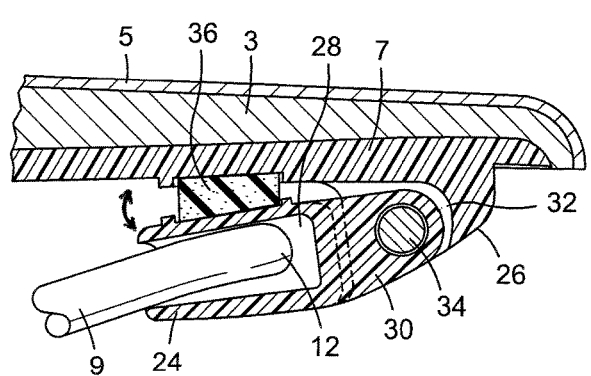
FIG. 6 is an enlarged detail taken from FIG. 5 to illustrate the bumper retaining block being rotatable towards and away from the flexible saddle base with the resilient bumper sandwiched between the bumper retaining block and the saddle base.

FIGS. 5 and 6 of the drawings show the adjustable flex bicycle saddle 1 after a replaceable bumper 36 that meets the needs of the rider has been selected and seated in the bumper recess 38 at the front of the saddle base 7. The free ends of the detachable rails 9 and 10 are pushed inwardly of the holes 18 and 20 formed in the rail holders 14 and 16 at the rear of the saddle base 7. The round nose 12 at which the rails 9 and 10 are joined together and which lies opposite the free ends is removably received inwardly of the open mouth 28 of the bumper retaining block 24. With the bumper retaining block 24 pivotally and detachably connected to the stationary end cap 26, the pair of detachable rails 9 and 10 will be suspended between the rail holders 14 and 16 and the bumper retaining block 24 at opposite ends of the saddle base 7. The round nose 12 of rails 9 and 10 pushes the bumper retaining block 24 towards the replaceable bumper 36 to be compressed against the saddle base 7.

Should a new rider be seated on the adjustable flex saddle 1 or the conditions of the riding path change, it may be desirable to change the flexibility of the saddle base 7 by replacing the bumper 36 that is currently being held against the saddle base. To accomplish the foregoing, and referring particularly to FIGS. 4-6 of the drawings, the pivot pin 34 is first removed, and the bumper retaining block 24, with the round nose 12 of the rails 9 and 10 still coupled thereto, is withdrawn from the stationary end cap 26. The detachable rails 9 and 10 are then pulled out of their prior attachment between the rail holders 14 and 16 and the bumper retaining block 24.

The rider may now simply remove the original resilient bumper 36 from its bumper recess 38 and replace the original bumper with a different bumper having the density required to change the flexibility of the saddle base 7 and the stiffness of the saddle 1 to respond to the weight of the rider. After the new bumper is in place, the rotatable bumper retaining block 24 is once again pivotally and detachably coupled to the stationary end cap 26 so as to be held down against the saddle base 7 with the new bumper sandwiched therebetween. The same or a different pair of rails 9 and 10 can be detachably connected between the retaining block 24 and the rail holders 14 and 16 in the manner previously explained.

The invention claimed is:

1. An adjustable flex saddle for a bicycle or a motorcycle upon which a rider is seated, said saddle comprising a flexible base to support the weight of the rider, said flexible base having a front and a rear, at least one saddle rail having first and opposite ends and running longitudinally along said flexible base between the front and the rear thereof to be connected to the bicycle or the motorcycle, a resilient bumper carried by said saddle, the density of said resilient bumper controlling flexibility of said flexible base and stiffness of said saddle; and a bumper retainer located at the front of said flexible base and engaging said resilient bumper, such that said resilient bumper lies between said flexible base and said bumper retainer, said bumper retainer having first and opposite ends and an opening at the first end thereof within which to removably receive the first end of said saddle rail by which the first end of said saddle rail is coupled to said bumper retainer so as to cause said bumper retainer to press said resilient bumper against said flexible base, the first end of said saddle rail being removed from the opening at the first end of said bumper retainer and uncoupled from said bumper retainer to permit the resilient bumper to be removed from between said bumper retainer and said flexible base and replaced by a different resilient bumper having a different density.

2. The adjustable flex saddle recited in claim 1, said saddle comprising a pair of saddle rails running longitudinally along said flexible base between the front and rear thereof, each of said pair of saddle rails having first and opposite ends, the first ends of said pair of saddle rails being joined together to form a nose that is removably received within the opening at the first end of said bumper retainer, whereby said pair of saddle rails is coupled to said bumper retainer so that said bumper retainer is held over and urged towards said resilient bumper and said resilient bumper is thereby pressed against said flexible base to control flexibility of said base.

3. The adjustable flex saddle recited in claim 2, further comprising a pair of rail holders located at the rear of said flexible base, each of said pair of rail holders having a hole formed therein within which to removably receive the opposite end of a respective one of said pair of saddle rails.

4. The adjustable flex saddle recited in claim 1, wherein the opposite end of said bumper retainer has a coupling end which lies opposite the opening at the first end thereof, said saddle further comprising a stationary end cap attached to said flexible base, the coupling end of said bumper retainer being pivotally connected to said stationary end cap so that said bumper retainer is rotatable relative to said stationary end cap towards and away from said flexible base with said resilient bumper sandwiched between said flexible base and said bumper retainer.

5. The adjustable flex saddle recited in claim 4, wherein the coupling end of said bumper retainer is pivotally connected to said stationary end cap by a removable pivot pin, said removable pivot pin being removed from said coupling end to enable said bumper retainer to be detached from said stationary end cap and said resilient bumper to be removed from said flexible base and replaced by a different resilient bumper having a different density.

6. The adjustable flex saddle recited in claim 1, wherein there is a recess formed in the front of said flexible base within which said resilient bumper is removably received so that said bumper retainer lays over and presses against said resilient bumper when the first end of said saddle rail is removably received by the opening at the first end of said bumper retainer.

7. An adjustable flex saddle for a bicycle or a motorcycle upon which a rider is seated, said saddle comprising:
a flexible base to support the weight of the rider, said flexible base having a front and a rear;
a bumper retainer having a first end and an opposite coupling end;
a resilient bumper lying between said flexible base and said bumper retainer;
a stationary end cap attached to said flexible base, the coupling end of said bumper retainer being pivotally connected to said stationary end cap so that said bumper retainer is rotatable relative to said stationary end cap towards and away from said flexible base; and
a saddle rail running longitudinally along said flexible base between the front and rear thereof to be connected to the bicycle or the motorcycle, said saddle rail having first and opposite ends with the first end of said saddle rail being coupled to said bumper retainer by which to hold said bumper retainer against said flexible base with said resilient bumper located therebetween when said bumper retainer is rotated towards said flexible base, the first end of said saddle rail being uncoupled from said bumper retainer by which to enable said resilient bumper to be removed from between said flexible base and said bumper retainer and replaced by a different resilient bumper having a different density when said bumper retainer is rotated away from said flexible base so that flexibility of said flexible base can be selectively controlled.

8. The adjustable flex saddle recited in claim 7, wherein the first end of said bumper retainer has an opening formed therein within which to removably receive the first end of said saddle rail by which said first end is coupled to said bumper retainer to hold said bumper retainer against said flexible base with said resilient bumper located therebetween.

9. The adjustable flex saddle recited in claim 7, wherein the coupling end of said bumper retainer is pivotally connected to said stationary end cap by a removable pivot pin, said removable pivot pin being removed from said coupling end to enable said bumper retainer to be detached from said stationary end cap and said resilient bumper to be removed from said flexible base and replaced by a different resilient bumper having a different density.

10. An adjustable flex saddle for a bicycle or a motorcycle upon which a rider is seated, said saddle comprising:
a flexible base to support the weight of the rider, said flexible base having a front and a rear;
a bumper retainer having an open first end and an opposite coupling end;
a resilient bumper lying between said flexible base and said bumper retainer;
a fastener;
a base extension extending from and lying below said flexible base, said fastener being removably received through said base extension and the coupling end of said bumper retainer by which said bumper retainer is detachably connected to said base extension; and
a saddle rail running longitudinally along said flexible base between the front and rear thereof to be connected to the bicycle or the motorcycle, said saddle rail having first and opposite ends with the first end of said saddle rail being removably received inwardly of the open first end of said bumper retainer by which to cause said bumper retainer to press said resilient bumper against said flexible base with said resilient bumper located between said bumper retainer and said flexible base, the first end of said saddle rail being removed from said bumper retainer after said fastener is first removed from said base extension and the coupling end of said bumper retainer by which to enable said resilient bumper to be removed from between said flexible base and said bumper retainer and replaced by a different resilient bumper having a different density so that flexibility of said flexible base can be selectively controlled.

11. The adjustable flex saddle recited in claim 10, wherein the coupling end of said bumper retainer is pivotally connected to said base extension by means of said fastener so that said bumper retainer is rotatable relative to said base extension towards and away from said flexible base.

12. The adjustable flex saddle recited in claim 10, said saddle comprising a pair of saddle rails running longitudinally along said flexible base between the front and rear thereof, each of said pair of saddle rails having first and opposite ends, the first ends of said pair of saddle rails being joined together to form a nose that is removably received within the open first end of said bumper retainer, whereby said pair of saddle rails is coupled to said bumper retainer so that said bumper retainer is held against and pushed towards said resilient bumper and said resilient bumper is thereby pressed against said flexible base to control flexibility of said base.

13. The adjustable flex saddle recited in claim 12, further comprising a pair of rail holders located at the rear of said flexible base, each of said pair of rail holders having a hole formed therein within which to removably receive the opposite end of a respective one of said pair of saddle rails.

\* \* \* \* \*